D. Holmes,
Anti-Friction Roller.
Nº 34,962. Patented Apr. 15, 1862.
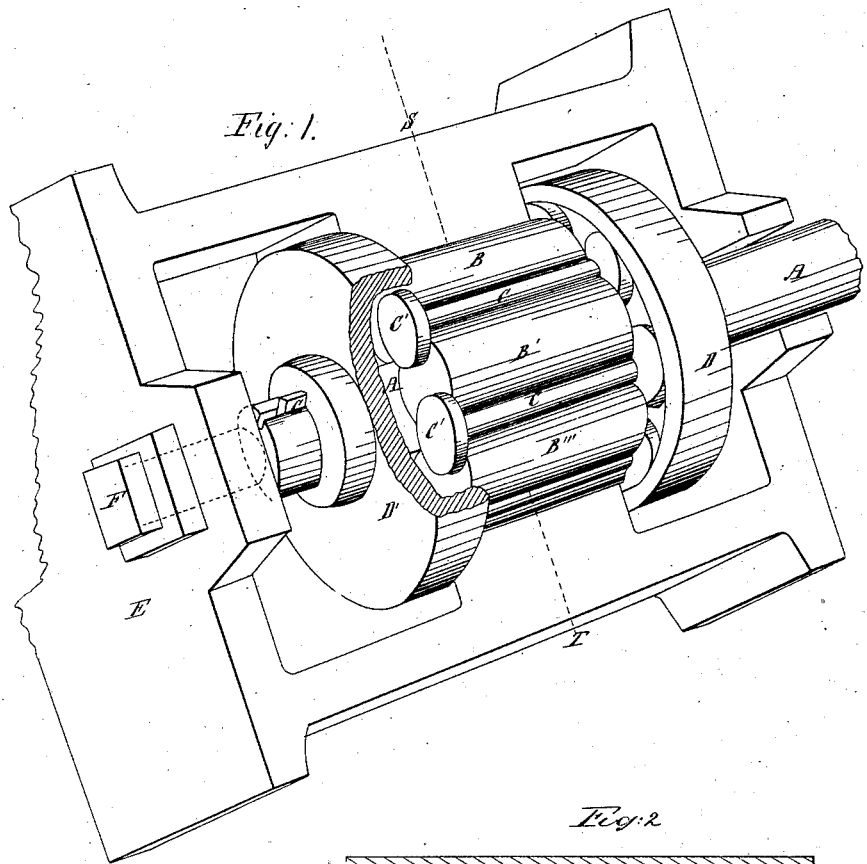
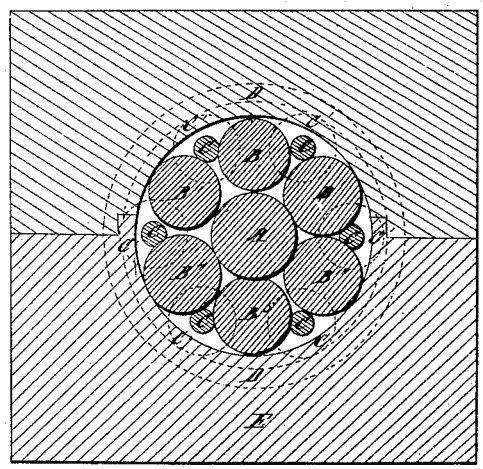
Witnesses
William Edson
John A. Cole
Inventor
Daniel Holmes

UNITED STATES PATENT OFFICE.

DANIEL HOLMES, OF CHELSEA, MASSACHUSETTS.

IMPROVEMENT IN ROLLING OR FRICTIONLESS JOURNALS.

Specification forming part of Letters Patent No. 34,962, dated April 15, 1862.

*To all whom it may concern:*

Be it known that I, DANIEL HOLMES, of Chelsea, in the county of Suffolk, in the State of Massachusetts, have invented a new and improved method of maintaining in their relative position the several rollers of an antifriction journal-box; and I do hereby declare that the following is a full and exact description thereof, reference being had to the accompanying drawings, and to the letters of reference marked thereon.

In the drawings similar letters refer to similar parts.

The nature of my invention consists in the peculiar arrangement of the rollers, by which all parts of their peripheries shall roll upon other peripheries, and that none of the rollers require axles of any kind, nor grooves nor guides to slide in, there being neither sliding nor axle motion.

To enable others skilled in the art to make and use my invention, I will proceed to describe it, reference being made to the accompanying drawings, and to the letters of reference marked thereon.

In Figures 1 and 2, A represents the shaft or axle. In the case of a rail-car the wheel (not represented in these drawings) is fastened permanently to the axle, as in the ordinary arrangement.

B B' B'', &c., in Figs. 1 and 2 represent the primary rollers, which serve to bear the load imposed upon the axle A. They roll immediately between the axle and the bearing part of the box E, as shown in Fig. 2.

C C' C C' in all the figures represent the secondary or spool-form rollers which serve to keep the primary rollers B B' B'' in position. The proportions between the rollers B B' B'', &c., and C C C are such that the rollers C C, &c., will always be held in a position exterior to the circle passing through the centers of the rollers B B' B'', &c. The spindle c, or small part of the rollers C C' C C', rolls upon the rollers B B' B'', keeping them from touching each other, and in turn are kept in relative position by them. The enlarged part or heads C' C' of the rollers C C' C C' roll upon the inside of flanges D' D, Figs. 1 and 3. The flanges D' D are made fast to the shaft A, and serve the purpose, together with the rollers C C' C C', of keeping the rollers B B' B'', &c., always in relative position with each other and around the shaft A. The ends of the rollers B B' B'', &c., and of C C' C C' are made slightly concave, in order that there may be no rubbing friction one upon the other. The insides of the flanges D D' are also concaved, as shown in Fig. 3, for the same purpose. G in Fig. 1 represents the key by which the flange D' is fastened to the shaft A.

In the perspective view, Fig. 1, but one-half of the box E is shown, the upper half being a counterpart of the part E. (Shown.)

F in Fig. 1 represents a set-screw, which keeps the shaft A from moving in the direction of the length.

The relative dimensions of all the parts (to be found by formula or experiment) must be such that all of the contacting peripheries shall move in harmony—that is, with the same velocities, in the same direction, each with each.

The several parts can be made of any suitable metal.

What I claim as my invention, and desire to secure by Letters Patent, is—

1. The enlarging of the ends of the rollers C C' C C', so that the velocity of their peripheries shall be just sufficient to secure a rolling motion on the inside of the flanges D D'.

2. The combination of the flanges D' D and the enlarged ends of the spool-form rollers C C' C C', (to secure rolling motion,) by means of which the principal rollers B B' B'', &c., are held in place, substantially as and for the purpose herein set forth.

DANIEL HOLMES.

Witnesses:
WILLIAM EDSON,
JOHN A. COLE.